United States Patent
Baggio et al.

(10) Patent No.: US 11,280,584 B2
(45) Date of Patent: Mar. 22, 2022

(54) BALLISTIC CORRECTION DEVICE FOR THE SIGHT MEMBERS OF WEAPONS

(71) Applicants: Roberto Baggio, Brescia (IT); Giuseppe Vittorio Petrone, Milan (IT); Fabrizio Piazza, Valli del Pasubio (IT)

(72) Inventors: Roberto Baggio, Brescia (IT); Giuseppe Vittorio Petrone, Milan (IT); Fabrizio Piazza, Valli del Pasubio (IT)

( * ) Notice: Subject to any disclaimer, the term of this patent is extended or adjusted under 35 U.S.C. 154(b) by 0 days.

(21) Appl. No.: 16/971,062

(22) PCT Filed: Jan. 28, 2019

(86) PCT No.: PCT/IB2019/050670
§ 371 (c)(1),
(2) Date: Aug. 19, 2020

(87) PCT Pub. No.: WO2019/162778
PCT Pub. Date: Aug. 29, 2019

(65) Prior Publication Data
US 2021/0071993 A1     Mar. 11, 2021

(30) Foreign Application Priority Data
Feb. 20, 2018   (IT) .................. 102018000002838

(51) Int. Cl.
*F41G 1/54*     (2006.01)
*F41G 1/38*     (2006.01)
*G01S 19/13*    (2010.01)

(52) U.S. Cl.
CPC ............... *F41G 1/54* (2013.01); *F41G 1/38* (2013.01); *G01S 19/13* (2013.01)

(58) Field of Classification Search
CPC ............... F41G 1/54; F41G 1/38; G01S 19/13
USPC .......................................................... 42/123
See application file for complete search history.

(56) References Cited

U.S. PATENT DOCUMENTS

| | | | | |
|---|---|---|---|---|
| 7,793,456 B1* | 9/2010 | Lacorte | ..................... | F41G 1/38 42/122 |
| 2004/0088898 A1* | 5/2004 | Barrett | ..................... | F41G 1/38 42/119 |
| 2012/0186131 A1* | 7/2012 | Windauer | ................. | F41G 1/38 42/122 |
| 2014/0115942 A1* | 5/2014 | Plaster | ..................... | F41G 1/38 42/126 |

* cited by examiner

Primary Examiner — Samir Abdosh
(74) Attorney, Agent, or Firm — Volpe Koenig (57) ABSTRACT

A ballistic correction device for sight members (of weapons) provided with an elevation adjustment turret is described. In particular, the device comprises detecting means, outside of the turret, to detect the rotations imparted by the shooter to the adjustment ring of the elevation turret, and displaying means to display the shooting distance and/or other shooting settings corresponding to the position the ring assumed. The device displays, for the shooter, the calibration of the turret from the moment the shooter observes the device. The shooter is no longer required to keep in mind the last calibration carried out. In the step of carrying out a new calibration, it is no longer necessary to consult the compensation tables, but simply to read the values displayed on the device as the ring of the turret is being rotated. A method for correcting the elevation of the weapon is further described.

14 Claims, 5 Drawing Sheets

BALLISTIC CORRECTION DEVICE FOR THE SIGHT MEMBERS OF WEAPONS

FIELD OF THE INVENTION

The present invention concerns a ballistic correction device, for sight members of firearms or crossbows, integrated in the sight member or applicable as a retrofit.

STATE OF THE ART

In the sector of firearms, lens optics, intended to be mounted on a weapon to allow the shooter to aim with the highest possible precision, are used. The lens optics is generally mounted in a raised position with respect to the barrel of the weapon, by means of slides or other reversible mechanical systems.

Normally, the lens optics comprises a reticle or horizontal and vertical sight marks visible to the shooter when looking into the eyepiece: the reticle or marks define the optic axis.

Given the lens optics is not coaxial with the barrel of the weapon but are above it, it is clear that if the optic axis remains parallel to the axis of the barrel, the shooter would not be able to make a targeted shot: the point of impact of the bullet would always be lower with respect to the point targeted.

Therefore, in practice the lens optics is provided with adjusting means that act on the fastening systems of the lens optics of the weapon, and which allow to change the orientation of the optic axis so that it intersects the longitudinal axis of the barrel, at a certain distance from the weapon, the desired distance.

For example, some telescopic sight devices, also named scopes, and in particular those for precision rifles, are provided with "turret" mechanisms for adjusting the drift, elevation and parallax. By rotating a notched ring of one of the turret mechanisms, the shooter intervenes on the fastening systems of the lens optics of the weapon, correspondingly and uniquely changing the drift or elevation or parallax depending on the cases.

More specifically, the adjustment or calibration of the elevation is necessary for compensating the loss of height, or drop, of the bullet. The bullets shot from a firearm, by the combined effect of the friction caused by air and gravity do not move in a straight line, but travel through parabolic trajectories and tend to fall towards the ground; this phenomenon is all the more evident the greater the distance of the firearm from the target at the time of the shot. The adjustment of the elevation is therefore used to make the point of impact of the bullet coincide with the point targeted through the lens optics of the weapon, at a predefined distance.

For example, in case of the aforesaid telescopic sight devices, the ring of the turret dedicated to the adjustment of the elevation generally displays the letters U and D. The letter U (up) denotes the rotation direction of the ring in order to lead the shots upwards, and therefore to make the reticle or marks move downwards. The letter D (down) denotes the rotation direction to be imparted to the ring in order to lead the shots downwards, and therefore to make the reticle or marks move upwards.

In practice, depending on the desired shooting distance, it is sufficient to act on the ring of the elevation turret to change the inclination of the optic axis with respect to the longitudinal axis of the barrel, up to obtaining the compensation of the drop of the bullet, while continuing to maintain the same targeted point.

The lens optics, for example the telescopic sight device, is well adjusted when the target to be shot is exactly at the zeroing distance, i.e. in the point of intersection of the hypothetically horizontal sight line and of the parabolic trajectory of the bullet.

For simplicity, the expression "shooting distance" will hereinafter be used to denote the "zeroing distance" once the compensation has occurred, i.e. after the shooter has acted on the elevation adjustment ring.

Unadjusted lens optics can cause deviations between the sight line and the point of impact of the bullet, even of several centimeters.

U.S. Pat. No. 7,793,456 describes a typical elevation adjustment turret system.

In the practice of hunting, hunters often are in the condition of having to change the elevation adjustment because wild animals are in continuous movement. However, frequent interventions on the elevation turret ring cause some drawbacks.

Firstly, considering that the ring of the elevation turret can carry out more than one complete revolution, after having made a certain number of adjustments, the shooter may not remember the last adjustment made over the time, i.e. may not be able to detect the effective adjustment of the ring although reading the value expressed on the notched scale present on the ring itself. This can cause errors in the subsequent shots. In other words, before carrying out a new adjustment or before firing a new shot, the shooter must remember the revolutions imparted to the ring, i.e. must remember exactly the last adjustment imparted and the calibration status of the elevation.

Another drawback is constituted by the fact that it is not easy to read the notched scale present on the ring of the turret, due to the fact that the numbers impressed on the ring are small and not immediately comprehensible. In fact, shooters use conversion tables they bring with them, consulting the ones a corresponding zeroing distance can be uniquely associated with each angular position of the ring, and therefore with each value readable on the notched scale. Moreover: the tables also allow to interpolate the numerical values in order to obtain intermediate zeroing distances between two positions of the ring.

As far as the drift is concerned, an incorrect calibration can cause errors in a sideways direction: the shot will go to the right or to the left of the target to be shot. However, the adjustment of the drift certainly is less critical with respect to the elevation adjustment, since it is rarely carried out. The regulation of the parallax is also not frequent.

Basically, the limitations of the current lens optics are clearly related to the elevation, which requires continuous adjustments, and are not related to the drift and parallax.

To a certain extent, the same problems are also encountered in crossbows.

US 2004/088898 describes a solution according to the preamble of claim 1. The lens optics is provided, in its inside, with an electronic encoder system to detect the angular position of the elevation turret. The encoder system is constructed together with the turret, i.e. is integrated inside it; this makes the lens optics expensive.

Other solutions of the known art are described in US 2012/186131 and US 2014/115942.

SUMMARY OF THE INVENTION

An object of the present invention is therefore to provide a ballistic correction device for sight members of firearms and crossbows, that allows to simply and effectively overcome the limitations of the technical solutions available, i.e. a device that simply and intuitively allows to detect the calibration parameters of an adjustment turret, in particular the elevation turret.

The present invention therefore concerns a ballistic correction device, according to claim 1, for sight members (of weapons) provided with an elevation adjustment turret.

In particular, the device comprises:
  detecting means to detect the rotations imparted by the shooter to the adjustment ring of the elevation turret, and
  displaying means to display the shooting distance and/or other shooting settings corresponding to the position of the ring.

Advantageously, the device is outside of the sight member, i.e. of the lens optics, with which it is combined, and is removably mountable on the sight member, as an aftermarket (retrofit) accessory.

The device according to the invention offers multiple advantages.

The device displays, for the shooter, the calibration of the turret from the moment the shooter observes the device.

A benefit is clear: the shooter is no longer required to keep in mind the last calibration carried out.

Another advantage is given in that, in the step of carrying out a new calibration, it will be no longer necessary to consult the compensation tables, but simply to read the values displayed on the device as the ring of the turret is being rotated. The corresponding and unique calibration value, preferably the value of the zeroing distance, i.e. of the shooting distance, is displayed on the device for each angular position of the ring.

The ballistic correction device according to the present invention, given it is not integrated at the time of construction in the sight member, as provided in the solutions according to the known art, being an accessory mountable on the sight member also at another time instead, after being sold, allows to obtain the aforesaid advantages at low costs. In other words, the sight member is not changed and must not be redesigned, reconstructed or altered: the device according to the present invention is easily mountable on existing sight members, because the detecting means to detect the rotations imparted by the shooter to the adjustment ring of the elevation turret are also outside of the sight member.

Preferably, the device comprises a control unit interfaced with the detecting means and the displaying means. The detecting means generate an indicative electrical signal of the angular position of the elevation adjustment ring, or indicative of the amplitude of one rotation thereof; the control unit processes the electrical signal and prepares the displaying of the shooting distance or the zeroing distance corresponding to the angular position of the ring at that time.

For example, the displaying means can be a display, also of touchscreen type that works as a user interface.

Preferably, the control unit is of microprocessor type, and is programmable. Preferably, the program is set to store the angular positions assumed by the ring over time, and/or to store the corresponding shooting distances and/or other shooting parameters. In other words, a log file with the data stored over time is stored in the control unit.

Preferably, the device fully replaces the compensation tables: the control unit is programmable to automatically convert, based on the conversion tables stored in the firearm used at that time, the signal coming from the detecting means into visual and/or sound messages, which uniquely correspond to the shooting distance set by the shooter acting on the ring.

Preferably, the detecting means are tracking means comprising a trimmer, for example potentiometric, connected to the ring of the elevation turret: each rotation imparted to the ring is also integrally imparted to the trimmer.

The trimmer is provided with a shaft connected to the elevation adjustment ring by means of gears or a belt.

In an embodiment, a wheel that, when the device is correctly mounted on the sight member, is in contact with the external surface of the ring, to roll when the ring is rotated, is keyed on the shaft of the trimmer. This way, the wheel transmits, to the shaft of the trimmer, the same rotations as those imparted to the ring by the shooter.

The wheel is preferably provided with a perimetrical gasket acting as a pacesetter with respect to the external surface of the ring.

In an alternative embodiment, the shaft of the trimmer is connected to the elevation adjustment turret by a transmission belt. For example, the device comprises a pulley that can be keyed on the elevation adjustment turret and a pulley keyed on the shaft of the trimmer, and the transmission belt connects the two pulleys so that the shaft of the trimmer and the elevation adjustment ring rotate in a synchronized way. This solution allows to mount the device spaced a few millimeters from the turret of the sight member: the transmission belt will however connect the device to the ring of the adjustment turret.

Preferably, the device comprises fastening means for fastening to the sight member (lens optics), for example brackets, rings, etc. The fastening means are designed to allow the positioning of the device on the lens optics, in a position so that the detecting means remain in contact with the ring of the elevation turret.

In an embodiment, the lens optics comprises a connection interface with an external display, for example a smartphone, that is used instead of the display.

In a second embodiment, the present invention concerns a kit comprising a sight member provided with an elevation adjustment turret and the ballistic correction device with the external assembly described above.

In a third embodiment, the present invention concerns a method, according to claim 15, for correcting the elevation of a firearm or crossbow, for example a rifle accessorized with a sight member provided with an elevation adjustment turret.

Optionally, the device, in the two embodiments described, can comprise one or more accessories mountable and demountable, as for example:
  a laser pointer that helps calibrate the lens optics,
  a detector of the GPS coordinates,
  a shot detecting device,
  a memory that cooperates with the shot detector to store, for example, the GPS coordinates corresponding to each shot and the calibration of the lens optics at the time of the shot,
  an I/O interface, for example with a USB port, to make a data connection with other electronic devices, for example a computer, in order to download the data described above and to be able to analyze it at another time, for example with the aid of satellite maps, for statistical and strategic purposes or for other scopes,
  a wireless communication interface with other devices of the present invention, to ensure that, in a beat with more shooters, a shooter can know the calibrations used by another shooter in real time.

The power supply of the device according to the present invention is preferably provided by one or more interchangeable batteries. In alternative or in addition, the device comprises a solar panel.

Preferably, the device also allows to store the calibrations of different types of ammunition, for example the calibrations relating to hunting ammunition and the calibrations relating to military ammunition, so that the shooter can easily pass from one calibration to the other from the moment he changes the type of ammunition shot with the firearm.

BRIEF LIST OF THE FIGURES

Further characteristics and advantages of the invention will be better highlighted by the review of the following detailed description of a preferred, but not exclusive, embodiment illustrated for illustration purposes only and without limitations, with the aid of the accompanying drawings, in which.

DETAILED DESCRIPTION OF THE INVENTION

Figure 8:
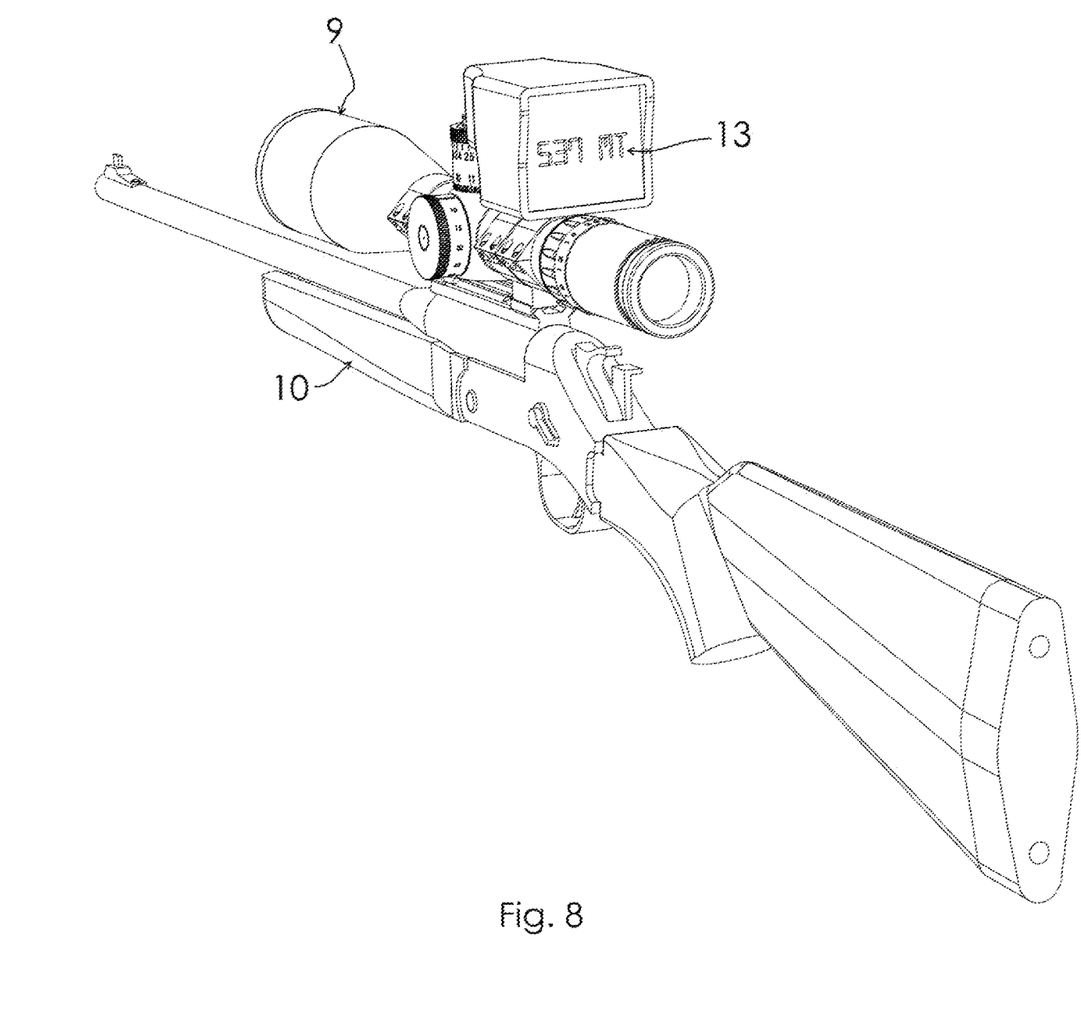
FIG. 8 is a left perspective view of the device shown in FIG. 1, mounted on the lens optics of a rifle.
Figure 9:
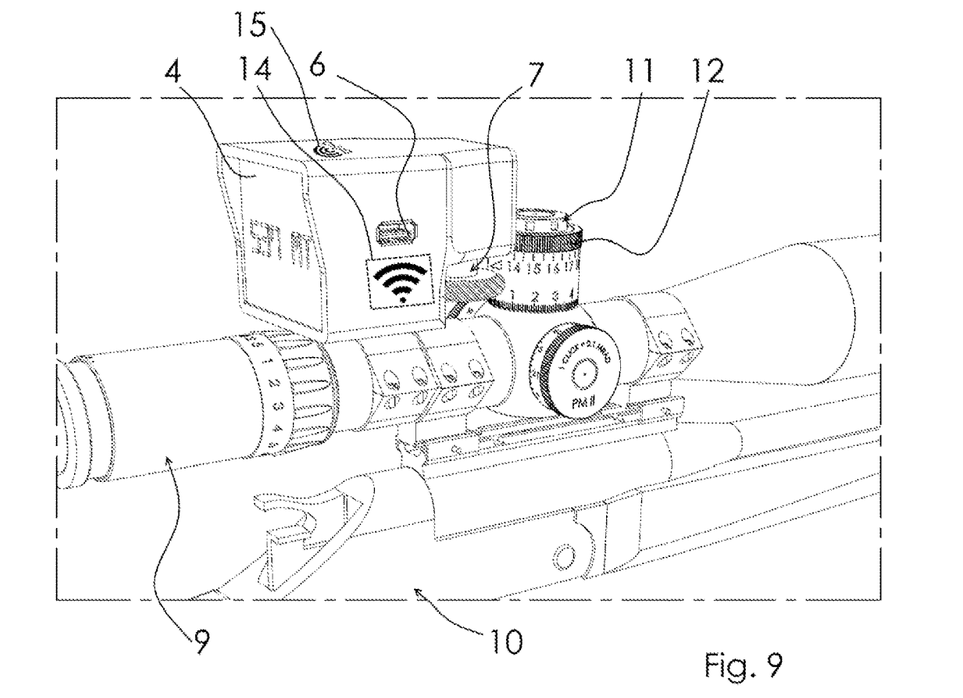
FIG. 9 is a right partial perspective view of the device shown in FIG. 1, mounted on the lens optics of the rifle shown in FIG. 8.
Figure 10:
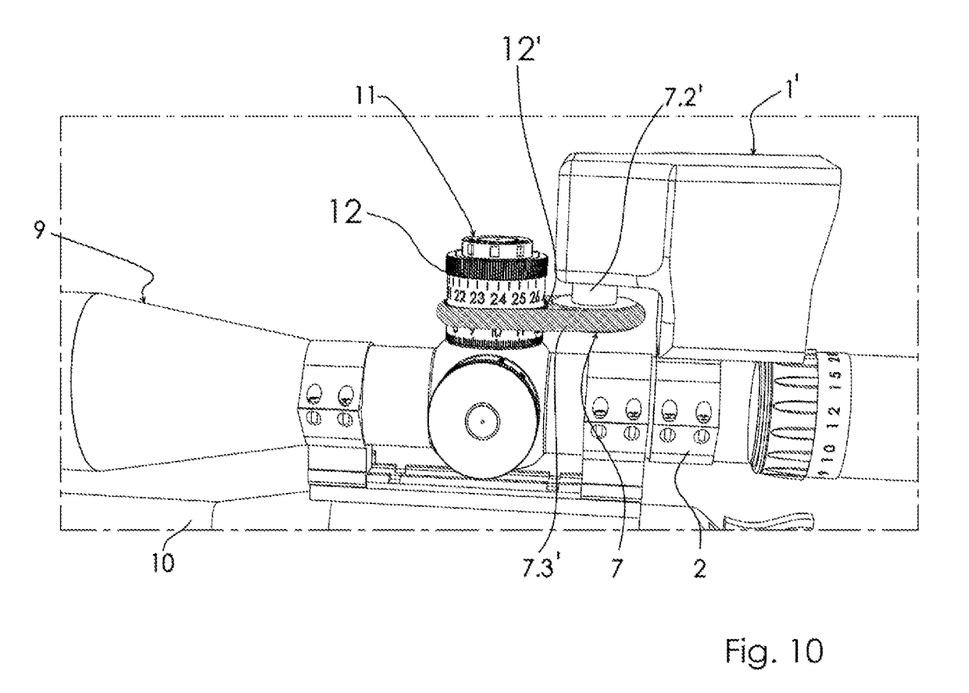
FIG. 10 is a schematic view of a second embodiment of the device according to the present invention.

FIG. 1-9 show a first embodiment of a device 1 according to the present invention; FIG. 10 shows a constructive variant 1'.

Figure 1:
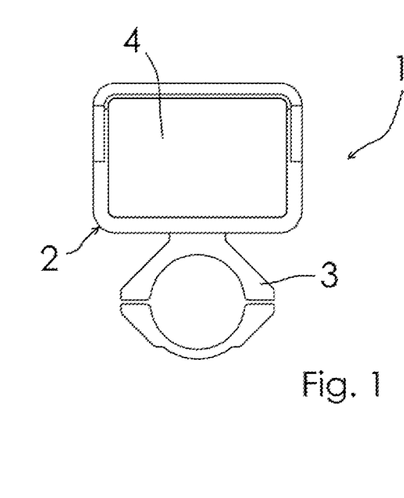
FIG. 1 is a front elevation view of a first embodiment of the device according to the present invention.
Figure 2:
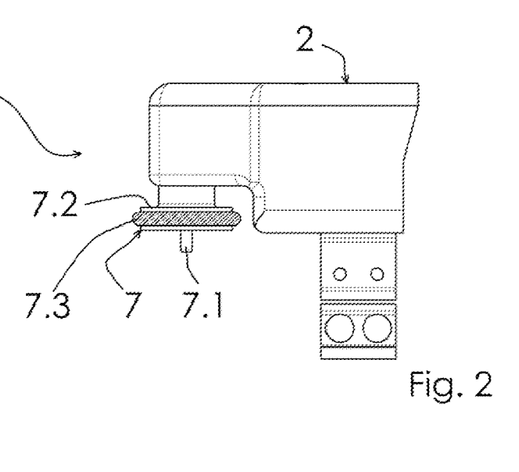
FIG. 2 is a side elevation view of the device shown in FIG. 1.
Figure 3:
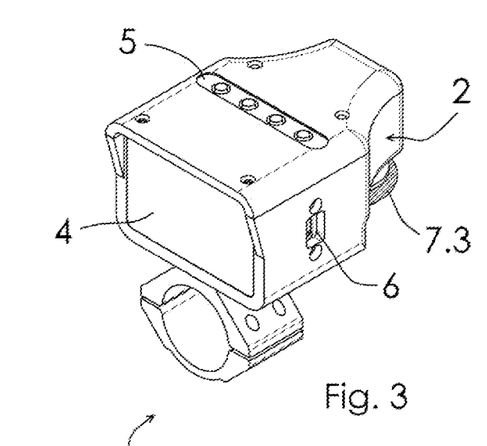
FIG. 3 is a front isometric view of the device shown in FIG. 1.
Figure 4:
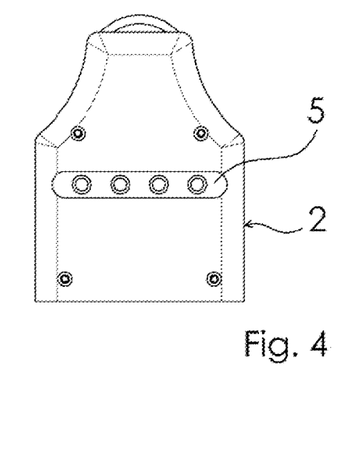
FIG. 4 is top view of the device shown in FIG. 1.
Figure 5:
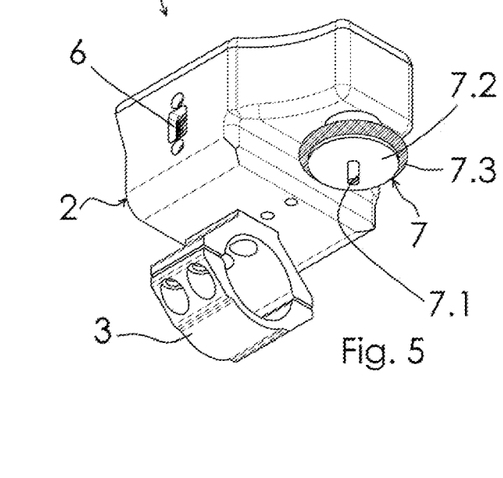
FIG. 5 is a rear isometric view of the device shown in FIG. 1.

The device 1 comprises a box-shaped body 2 and corresponding fastening means 3 for fastening to sight lens optics, preferably comprising a ring 2 reclosable on the body of the lens optics with screws.

A screen 4 that displays the messages in alphanumerical and/or graphical form to the user, for example a liquid crystal screen, is housed in the box-shaped body 2. When the device 1 is correctly mounted on sight lens optics, the screen remains facing towards the shooter holding the weapon. For this reason, the side of the screen is defined as the front side of the device 1.

A keyboard 5 is provided on the upper part of the body 2 of the device and constitutes an interface that allows the user to control the operations of the device. In alternative, or in addition, the screen 4 is of touchscreen type.

An I/O interface, for example a USB port for connecting the device 1 to external electronic devices, is provided on the side of the body 2. In alternative, or in addition, the device comprises an I/O interface of wireless type, for example Wi-Fi or Bluetooth.

The side of the device 1 opposed the screen 4 is defined as the back side; when the device 1 is correctly mounted on sight lens optics, the back side is facing the barrel of the weapon.

At the back side, the device 1 comprises a tracking mechanism 7, whose operation is to detect each rotation imparted by the shooter to the ring of the elevation turret and to measure the amplitude of each rotation. The mechanism 7 comprises a trimmer 7.1 with an angular transducer action, equipped with a shaft (shown in the figures) on which a wheel 7.2 is keyed. The wheel 7.2 is in turn equipped with an elastic gasket 7.3, for example made of rubber, that acts as a pacesetter.

For example, a material suitable for obtaining the elastic gasket 7.3 is a polyurethane having the following characteristics:

hardness 90 Sh A measured according to ASTM D-2240 standard;
modulus at 100% elongation: 8.2 MPa measured according to ISO 37 standard, with sample drawn at 8.5 mm/s;
modulus at 300% elongation: 13.8 MPa measured according to ISO 37 standard, with sample drawn at 8.5 mm/s;
breaking load, 41 MPa measured according to ISO 37 standard, with sample drawn at 8.5 mm/s;
elongation at break, 460% measured according to ISO 37 standard, with sample drawn at 8.5 mm/s;
abrasion resistance, 34 mm/3 measured according to DIN 53516 standard;
tear resistance (specimen C), 84 kN/m measured according to ISO 34-1 standard;
permanent deformation, 30% measured according to ISO 815 standard, method B, 22 hours at a temperature of 70° C.

The wheel 7.2 can be turned clockwise and counterclockwise; the rotations are directly imparted to the trimmer 7.1 meaning that the shaft of the trimmer rotates integrally with the wheel 7.2.

Figure 6:
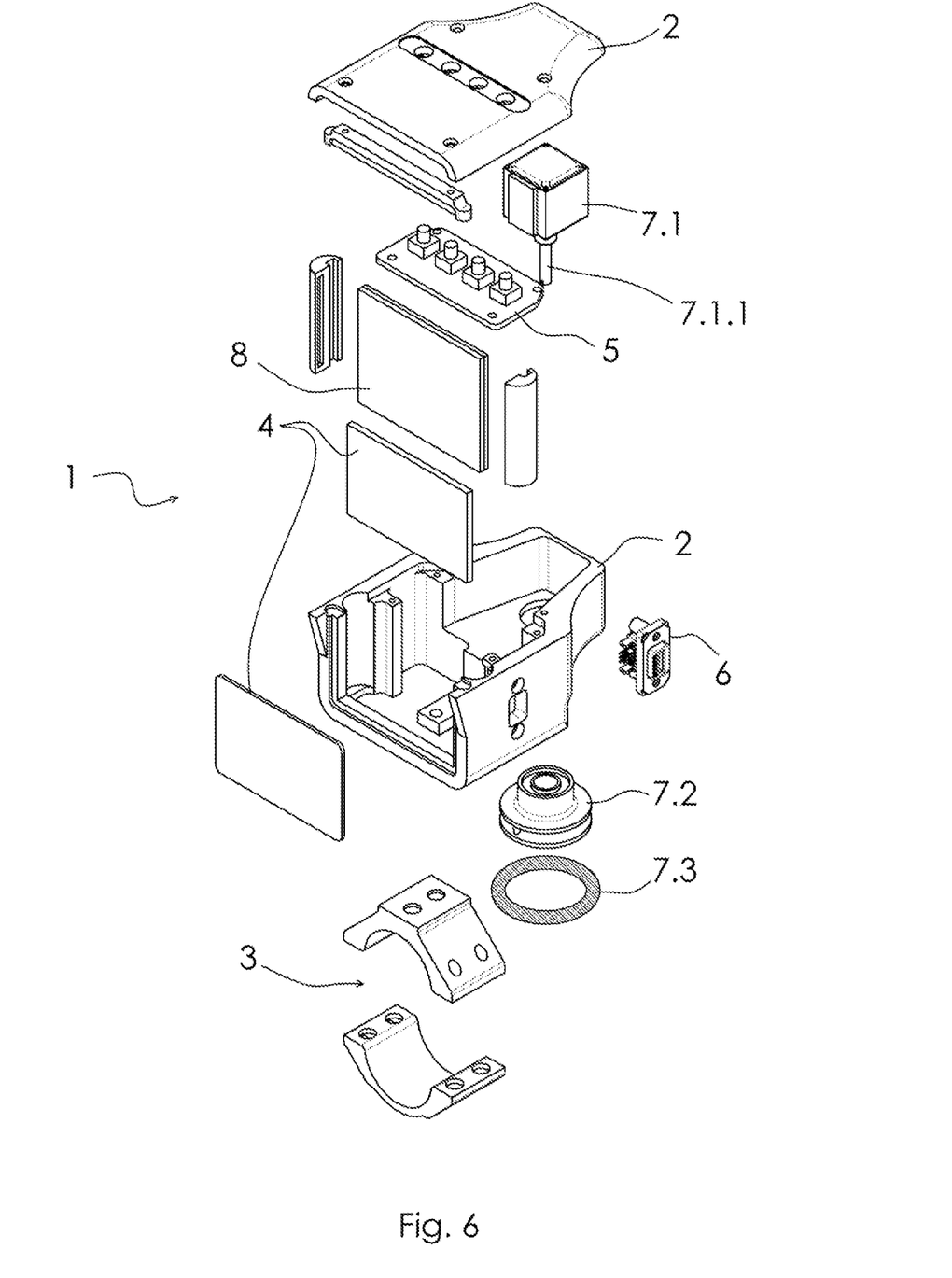
FIG. 6 is an exploded view of the device shown in FIG. 1.

The shaft 7.1.1 of the trimmer 7.1 is clearly visible in FIG. 6. Preferably, the trimmer 7.1 is of potentiometric type.

The reference number 8 denotes a printed circuit with a microprocessor unit of the programmable type, which controls all the functions of the device, including the possible connections with other external devices by means of the I/O interfaces described above, and is accessible by the user by means of the keyboard 5 or the screen 4.

Figure 7:
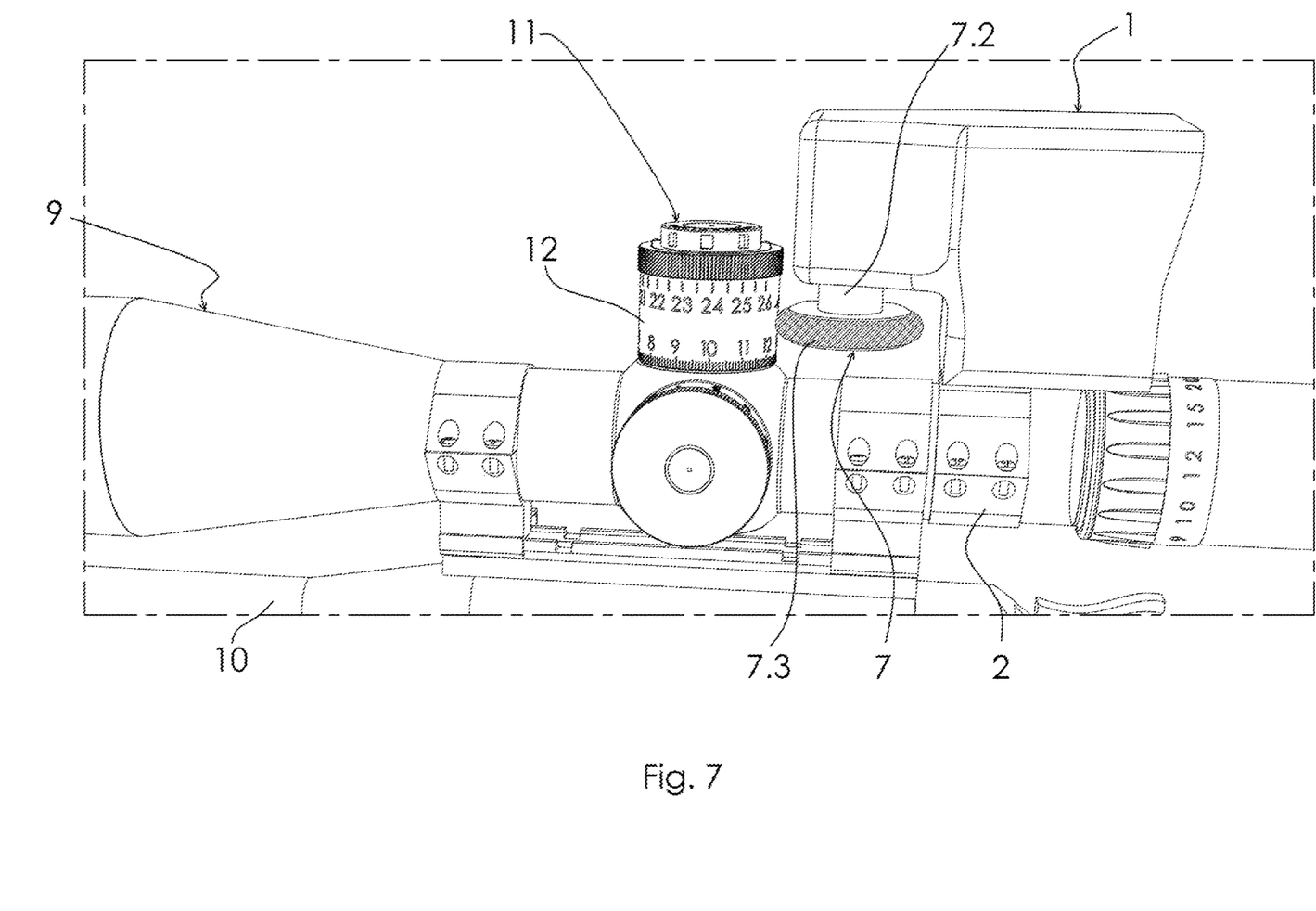
FIG. 7 is a side view of the device shown in FIG. 1, mounted on lens optics for rifles.

FIG. 7 shows the device 1 mounted on lens optics 9 of a rifle 10. The lens optics 9 is a telescopic sight device provided with an elevation adjustment turret 11. The reference number 12 denotes the ring of the turret 11, rotatable by the shooter in both directions to raise or lower the reticle or the marks visible to the shooter when looking through the lens optics itself.

As can be noted, the device 1 is correctly arranged on the lens optics 9 with a tracking mechanism 7 in contact with the ring 12 of the elevation turret 11. The gasket 7.3 adheres to the ring 12 and each rotation ("click") imparted to the ring 12 is transmitted, with the same amplitude—i.e. without slippage—, to the wheel 7.2 that in turn transmits the rotations to the shaft 7.1.1 of the trimmer 7.1.

The trimmer 7.1 is configured to generate an electrical signal in response to the rotations imparted to the shaft 7.1.1. The electrical signal is processed by the control unit 8 to determine the following parameters:

1) the direction of the rotation imparted to the wheel 7.2 and therefore to the ring 12 of the turret 11;
2) the amplitude of the same rotation, for example in radiants.

The control unit 8 comprises a memory, preferably static, in which all of the parameters detected are stored, such as in a log file. In substance, all of the rotations imparted to the ring 12 are stored in the device 1.

The preferred calibrations of each shooter, as described below, and/or the calibrations relating to each type of ammunition shot, useful characteristic whenever a same weapon is used by more shooters for different purposes and, therefore, with different ammunition, can be stored in the device 1, 1'.

By taking care to initialize the device 1, by zeroing the memory and coupling it with the ring 12 initially in its zero position, the device 1 keeps track of each adjustment imparted to the elevation by the ring 12.

The result is shown in FIG. 8. The messages 13 that provide information on the calibration of the turret 11 at that time are projected onto the screen 4. In the example shown, the message is "537 mt," i.e. 537 meters. This means that the elevation is adjusted to shoot to a distance of 537 meters. Considering what described above, if the shooter wants to make a new shot to shoot a target at a different distance, for example at a distance of 400 meters, he must act on the ring 12 of the turret 11 to raise the reticle or the marks of the lens optics 9.

As explained above, traditionally, the shooter relies on his memory to remember the last adjustment imparted to the turret 11 and on the printed compensation tables. Thanks to the device 1, the last adjustment carried out is available to the shooter in the memory of the device itself and on the display 4; by acting on the ring 12 again, the shooter will see the numbers change correspondingly on the display 4 until reaching the desired distance of 400 meters.

The compensation tables for the rifle 10 are stored in the control unit 8, so that the shooter must no longer interpolate the data on the paper tables, which are uneasy to consult while hunting, as he will immediately see the value of the shooting distance, corresponding to the adjustment imparted to the ring 12 at that time, on the display 4.

As mentioned above, the device 1 optionally comprises an I/O interface 14 for the connection with external electronic devices. In FIG. 9, in addition to the USB port, an I/O interface 14 of wireless type, in particular Wi-Fi, or in alternative Bluetooth or radio, is schematically depicted. Thanks to this interface, the device 1 can be interfaced with other devices 1 of the same type, also when hunting, in order to share the information relating to the shooting parameters selected at any time by each hunter between hunters, or for the connection with computers for the statistical analysis of the data stored in the device, an analysis useful for learning and improving the quality of each shooter.

The reference number 15 schematically denotes a GPS module for detecting the coordinates of the device 1. The coordinates are useful both for the analysis of the data collected and for communicating one's position to other hunters. For example, the GPS module 15 collects the coordinates and the interface 14 transmits them to the devices registered in a dedicated network: the other hunters can see the position detected by the module 15 on their own smartphones.

The sharing of information relating to the position of each hunter is also useful in avoiding accidents.

At the end of a hunting trip, the hunters can see the movements and paths covered by each shooter over time on a satellite map.

The device 1 shown in FIGS. 1-9 is external to the rifle 10 and to the corresponding lens optics 9. FIG. 10 shows an embodiment 1' wherein the reference 7.2' denotes a pulley and 7.3' a transmission belt functionally combined with the pulley 7.2' and the ring 12 of the elevation tower. The transmission belt 7.3', which can be smooth or toothed, transmits the rotation from the ring 12 to the shaft 7.2' of the trimmer in a synchronized way, i.e. without slippage: the rotations imparted by the shooter to the ring 12 are transmitted without variations to the pulley 7.2'. If necessary, the device 1' comprises a further pulley 12' that can be keyed or fitted on the ring 12 to guide the transmission belt 7.3'.

In the embodiment 1', the pulley 7.2' does not touch the ring 12 directly: the transmission belt 7.3' allows to mount the device 1' at a certain distance from the turret 11, for example 2 mm or 10 mm, depending on the necessity.

The transmission belt 7.3' can be made, for example, of the same material as the one described for the gasket 7.3.

Clearly, the device 1' can be tooled up with the accessories described above in relation to the device 1.

Preferably, the devices 1 and 1' are provided with means (not shown) for detecting a shot, for example optical or magnetic means that detect the movements of the hammer of the rifle. This way, it is possible to store the shooting parameters selected by the shooter for each shot: elevation adjustment, GPS position, exact time of the shot.

The invention is also applicable to the sight members of crossbows.

The invention claimed is:

1. A ballistic correction device (1, 1') for a sighting member, or lens optics, (9) of weapons equipped with an elevation adjustment turret (11), the device (1, 1') comprising:
    detecting means (7) to detect rotations imparted by a shooter of the weapon to an adjustment ring (12) of the elevation turret (11);
    displaying means (4) to display a shooting distance (13) and/or other shooting settings corresponding to a position of said ring (12),
    wherein the device (1, 1') is separate from the sighting member or lens optics (9) with which it is combined, and is removably mountable thereon.

2. The device (1, 1') according to claim 1, further comprising a control unit (8) interfaced with the detecting means (7) and the displaying means (4), wherein the detecting means (7) generate an electrical signal indicative of an angular position of the elevation adjustment ring (12) or of an amplitude of a rotation thereof, and wherein the control unit (8) processes the electrical signal and controls a display of the shooting distance (13) corresponding to the angular position of the ring (12) at that time.

3. The device (1, 1') according to claim 2, wherein the control unit (8) is of microprocessor type with program means and an internal memory, and it is programmed to store angular positions assumed over time by the ring (12) and/or to store corresponding shooting distances (13) and/or other shooting settings.

4. The device (1, 1') according to claim 3, wherein the control unit (8) is programmed to automatically convert, based on stored conversion tables, the signal coming from the detecting means (7) into visual and/or sound messages which uniquely correspond to the shooting distance (13) set by the shooter by acting on the ring (12).

5. The device (1, 1') according to claim 1, wherein the detecting means (7) are tracking means comprising a trimmer (7.1), connected outside of the ring (12) of the turret (11) of the lens optics (9) by means of gears (7.2) or a transmission belt (7.3').

6. The device (1) according to claim 5, wherein the trimmer (7.1) is provided with a shaft (7.1.1) to which a portable wheel (7.2) that is in contact with an external surface of the ring (12) is keyed, in order to roll when the ring (12) is turned and to transmit to the shaft (7.1.1) of the trimmer (7.1) the same rotations as those imparted to the ring (12).

7. The device (1) according to claim 6, wherein the wheel (7.2) is provided with a perimetrical gasket (7.3) that acts as a pacesetter with respect to the external surface of the ring (12).

8. The device (1') according to claim 5, comprising a transmission belt (7.3'), and wherein the trimmer (7.1) is provided with a shaft (7.1.1) connected to the ring (12) by means of the transmission belt (7.3'), in order to rotate in a synchronized way with the ring (12).

9. The device (1, 1') according to claim 1, further comprising fastening means (3) to fasten the device (1) external to the sighting member or lens optics (9), the detecting means (7) being in contact with the ring (12) of the elevation turret (11) or connected thereto by means of a transmission belt (7.3').

10. The device (1, 1') according to claim 1, wherein the displaying means comprise a screen (4).

11. The device (1, 1') according to claim 2, further comprising at least one of:

a physical (6) or wireless (14) I/O connection interface to external electronic devices with the control unit (8) for reprogramming the control unit (8) and/or sharing the data stored in the control unit (8);

a GPS module (15) to detect the coordinates, with a frequency that can be adjusted from the control unit (8);

detecting means to detect shots of the weapon combined with the sighting member or lens optics (9);

a user interface (5), connected to the control unit (8);

a laser pointer, capable of detecting distances.

12. The device (1, 1') according to claim 1, further comprising one or more interchangeable batteries to supply electric power.

13. The device (1, 1') according to claim 1, further comprising a control unit (8) with memory programmable for storing calibrations relating to one or more shooters and/or to one or more types of ammunition, and to make the calibration selectively available to a user upon request.

14. A kit comprising a sight member (9) equipped with an elevation adjustment turret (11) and a ballistic correction device (1) according to claim 1.

* * * * *